ELECTRONIC DIGITAL COMPUTING APPARATUS

Filed Dec. 11, 1950 3 Sheets-Sheet 1

Albert Maurel Uttley
Spencer Watkins Noble
Ronald Herbert Arthur Carter
Inventors By
Stevens, Davis, Miller & Mosher
their Attorneys Albert Maurel Uttley
Duncan Watkins Noble
Ronald Herbert Andrew Carter
*Inventors*

By
Stevens, Davis, Miller & Mosher
their *Attorneys*

Albert Maurel Uttley
Spencer Watkins Noble
Ronald Herbert Arthur Carter
*Inventors*

By
Stevens, Davis, Miller & Mosher
their *Attorneys*

United States Patent Office 2,808,983

Patented Oct. 8, 1957

2,808,983

ELECTRONIC DIGITAL COMPUTING APPARATUS

Albert Maurel Uttley, Great Malvern, Spencer Watkins Noble, Upper Colwall, and Ronald Herbert Arthur Carter, Malvern, England, assignors to National Research Development Corporation, London, England Application December 11, 1950, Serial No. 200,138

Claims priority, application Great Britain December 23, 1949

16 Claims. (Cl. 235—61)

Figure 1:
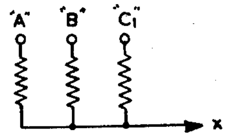

This invention relates to electrical apparatus for performing binary digital computation and relates more particularly to electronic circuit arrangements for performing the process of addition of binary-digital numbers which are representable by electrical signals.

This invention is particularly concerned with the addition of digit signals after they have been introduced into the proper matrix and with the derivation of the correct sum and carry digits.

In the normal arithmetic addition of two multi-digit numbers designated by, say, letters "A" and "B," the numbers have to be added digit by digit, the digital addition giving rise at each stage to a sum digit "S" and a "carry" digit "C" which is to be added in at the next digital additional. In general, therefore, three digits have to be added together each time, "A," "B" and the carried digit "C1" to produce the sum digit "S" and the digit "C2" which is to be carried to the next step of addition.

In electronic computers it is usually convenient to represent digits by pulses of voltage or current or by voltage levels or current values or the absence of such pulses or voltage levels or current values at appropriate times. The pulses or the corresponding voltage or current levels may be standardized to pre-determined values and the existence of such a pulse or voltage or current level may represent a "1" while the absence of such a pulse or voltage level of current value may represent a "0."

It is thus apparent that when such a mode of electrical representation is employed the failure of a "1" signal to arrive at any point in a computer is indistinguishable from the occurrence of a "0" signal so that an erroneous result will be obtained if a "1" digit fails and will not be detected by the computer. This difficulty may be overcome if digits of both kinds "0" and "1" are represented by distinct electrical signals, a pulse, voltage level or current value being used to represent a "1" digit while a pulse voltage level or current value equal in magnitude but of opposite polarity being used to represent a "0" digit. Distinction can then be made between "0" and a failure resulting in the absence of a digital signal.

Three circuit states have then to be considered. First, the pulse amplitude or current value is zero or the voltage level is at or about earth voltage during the quiescent period between digits. Second, the pulse amplitude or current value is of some pre-determined magnitude in the positive sense or the voltage level is above that of earth again to some predetermined value, to represent the digit "1." Third, the pulse amplitude or current value or voltage level is opposite to that of the second state just described, and of equal magnitude, to represent the digit "0." The absence of a digit state at an instant when there should be one is to be regarded as a fault and this absence may be caused to operate an alarm system.

The rules for binary addition are given in Table I for all the combinations of input digits "A," "B" and "C1" which may occur including the possibilities of failure of one or more of these digits. Rules 9 to 27, which are those specifying the cases in which one or more of the input digits are failures, define that no "S" or "C2" digits must be produced in those cases.

*Table I*

| Rule | Numbers to be added | | | Result | |
|---|---|---|---|---|---|
| | "A" | "B" | "C1" | "S" | "C2" |
| 1 | 1 | 1 | 1 | 1 | 1 |
| 2 | 0 | 1 | 1 | 0 | 1 |
| 3 | 1 | 0 | 1 | 0 | 1 |
| 4 | 0 | 0 | 1 | 1 | 0 |
| 5 | 1 | 1 | 0 | 0 | 1 |
| 6 | 0 | 1 | 0 | 1 | 0 |
| 7 | 1 | 0 | 0 | 1 | 0 |
| 8 | 0 | 0 | 0 | 0 | 0 |
| 9 | F | 1 | 1 | F | F |
| 10 | 1 | F | 1 | F | F |
| 11 | 1 | 1 | F | F | F |
| 12 | 0 | F | 1 | F | F |
| 13 | 0 | 1 | F | F | F |
| 14 | F | 0 | 1 | F | F |
| 15 | 1 | 0 | F | F | F |
| 16 | 0 | 0 | F | F | F |
| 17 | F | 1 | 0 | F | F |
| 18 | 1 | F | 0 | F | F |
| 19 | 0 | F | 0 | F | F |
| 20 | F | 0 | 0 | F | F |
| 21 | 0 | F | F | F | F |
| 22 | F | 0 | F | F | F |
| 23 | F | F | 0 | F | F |
| 24 | 1 | F | F | F | F |
| 25 | 1 | F | F | F | F |
| 26 | F | F | 1 | F | F |
| 27 | F | F | F | F | F |

One type of known circuit arrangement for the addition of binary-digital numbers and which may be so called an analogue type circuit, operates by observation of the number of "1" digits which occur simultaneously on the input connections. "1" digits may be represented by amplitude stabilised current pulses and the amplitude of the resultant current pulse produced by combination of a number of input signals may be measured to observe the number of "1" digits occurring. An adder working on such a principle is described in the specification of British patent application No. 19,967/48. It is obvious that such an adder is incapable of detecting failures in the input signals and that the signals corresponding to rule 9 of Table I for instance would give the same results as rules 2, 3 and 5 and that therefore rule 9 would be indistinguishable from rules 2, 3 and 5 in a system in which two state representation of signals was employed.

It is an object of the present invention to provide an adder circuit capable of accepting signals representing "1" digits by pulse amplitudes, voltage levels or current values, of one pre-determined magnitude in one sense and "0" digits by pulse amplitudes, voltage levels or current values of equal magnitude but in the opposite sense, absence of a digit due to any failure then being represented by a datum level, and capable of discriminating against rules 9 to 27 of Table I.

Figure 2:
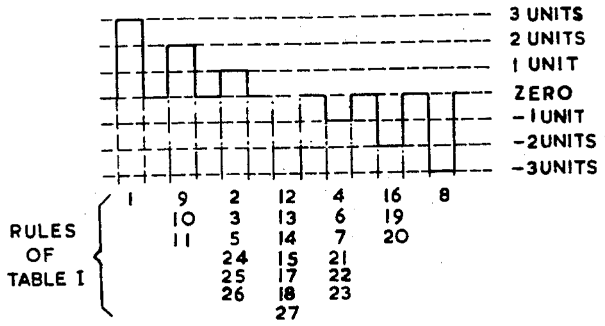
Figure 3:
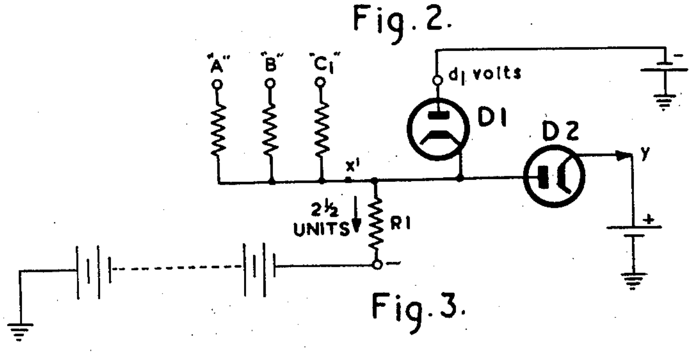
Figure 4:
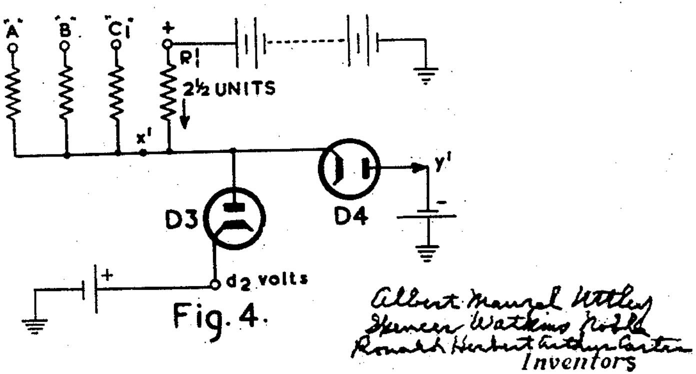

In the ensuing description reference will be made to the accompanying drawings in which:

Fig. 1 is a circuit diagram illustrative of the principle underlying the invention, Fig. 2 is an explanatory diagram, Fig. 3 is one form, and Fig. 4 is a complementary form of matrix circuit employed in carrying out the invention.

Figure 5:
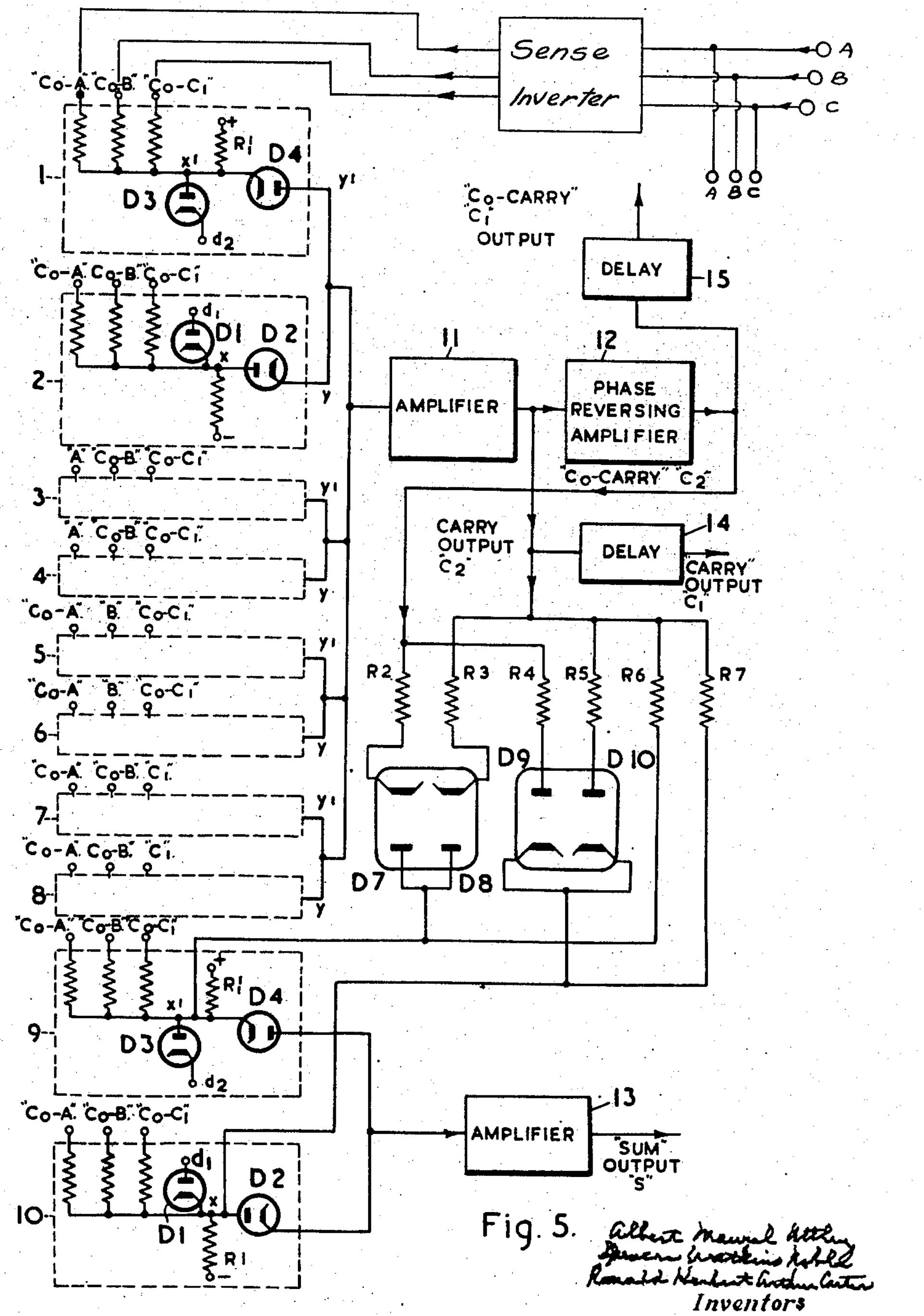
Figure 6:
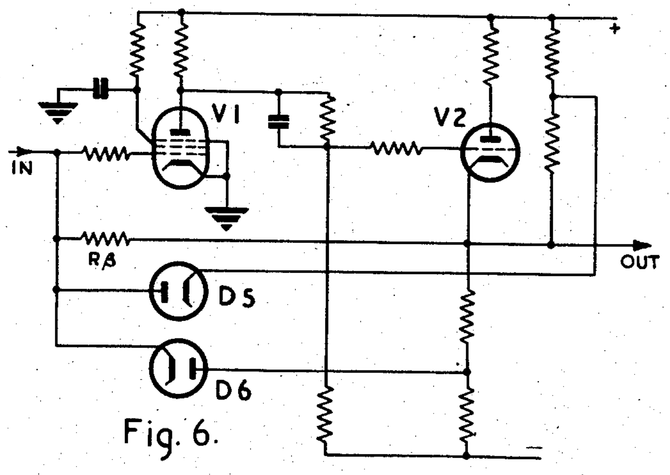
Figure 7:
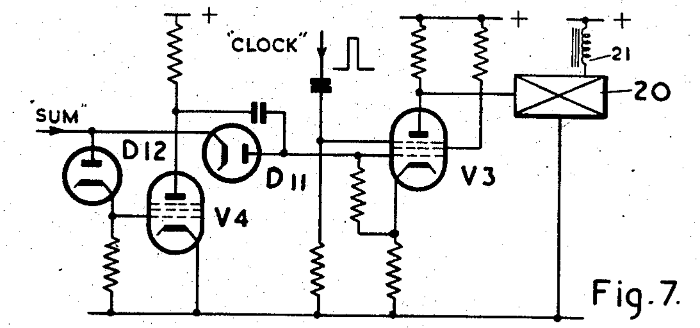
Figure 8:
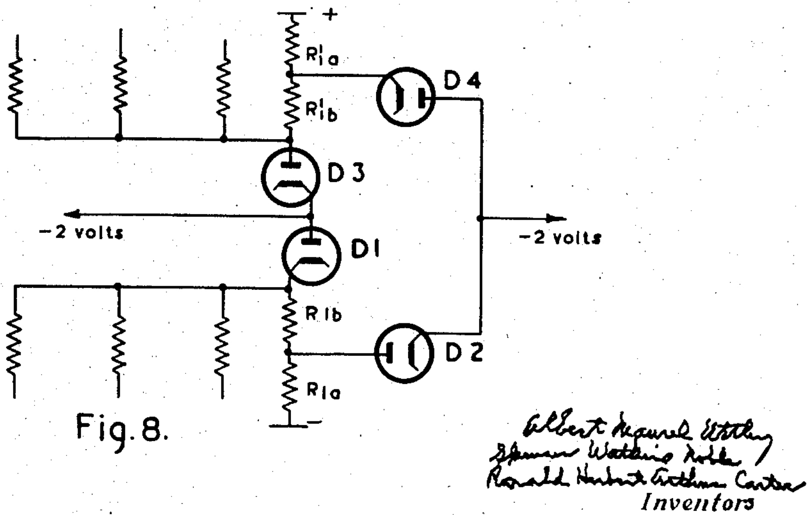

Fig. 5 is a circuit diagram, partly schematic of a complete adding circuit according to the invention, Fig. 6 is an amplifying circuit which may be used in the arrangement according to Fig. 5, Fig. 7 is a circuit which may be used for performing a check on the correct operation of the adding circuit of Fig. 5, and Fig. 8 is a modification forming a combination of the matrix circuits shown in Figs. 3 and 4.

A circuit which may be used to observe the number of coincident digital signals comprises a matrix of resistors as indicated in Fig. 1. In this circuit arranged to handle three input digits, "A," "B," and "C1," the digit signals are supplied from relatively low impedance sources as voltage pulses of say 30 volts amplitude to the resistors which are joined to a common point X. Each resistor has a fairly accurately determined value of say 10,000 ohms and the incidence of a digit pulse therefore causes a standard current of 1 unit (in this case approximately 3 milliamps.) to flow to the common point. The net current flowing to or from the common point is thus a measure of the combination of pulses applied to the "A," "B" and "C1" inputs. If the digits are represented in the three-state fashion, 1's by positive pulses and 0's by negative pulses then the current flowing at the point X for the various rules of Table I is as indicated diagrammatically in Fig. 2 the current flowing in each separate resistor being considered as one unit.

It may be seen from Fig. 2 that only the occurrence of combinations of digits corresponding to rules 1 and 8 can be detected unambiguously by such a matrix circuit, as only the simultaneous occurrence of 3 positive or 3 negative signals can result in 3 units of current flowing at point X. It will be seen that by inverting the polarities of the appropriate digital signals any one of the combinations of digital signals corresponding to rules 2 to 7 can be made to give rise to 3 units of current at the point X of Fig. 1, in the absence of a failure. For example, if the "A" signal is inverted before application to a matrix of the form shown in Fig. 1, then 3 units of current will only be produced by digital combinations corresponding to rules 2 and 7. The current will be positive for rule 2 and negative for rule 7. If now a matrix element is provided for each of rules 1 to 8, and the digital signals are applied to these circuits with appropriate inversions of polarity, it can be arranged that a total of 3 units of current will be produced at the point X of only that matrix element corresponding to the applied combination of digit signals. It can further be arranged that only that matrix element at which 3 units of current exists will deliver an output signal, and that this output signal may be of either polarity (corresponding to a "1" or a "0" in dependence upon the sense of the current in the matrix element.

The above desiderata are employed according to the invention to provide an adding circuit for binary digital numbers.

The manner in which the existence of 3 units of current at the point X of the circuit of Fig. 1, and the sense of that current, may be distinguished, may be understood by reference to Figs. 3 and 4. In Fig. 3 point X′ of the matrix element is connected to the cathode of the diode or crystal D1, the anode of which is connected to the source of constant voltage *d*1. A resistor R1 from the point X′ is connected to a negative current source and is of such a value that 2½ units of current are drawn through the diode D1. The practical method of biasing the diodes D1 and D2 will be hereinafter more particularly described with reference to Fig. 8 of the drawings. For purposes of explanation conventional potential sources are shown in Figs. 3 and 4. Notice that only small biasses are applied to the diodes. Consider sources of current, which may be provided by voltage pulses of say 30 volts amplitude, to be connected to points "A," "B" and "C1" and that rule 2 of Table I applies. From Fig. 2 it can be seen that the current at point X′ will be plus one unit. This current will pass down the resistor R1 leaving 1½ units of current through the diode or crystal D1. Again, consider the application of current to the three points "A," "B" and "C1," such that rule 9 of Table I applies. It can be seen from Figure 2 that 2 units of current will flow at point X′. This current will flow through resistor R1 leaving ½ unit through the diode or crystal D1. If, however, rule 1 of Table I applies, it can be seen from Fig. 2 that 3 units of current will flow at point X′ and of these 2½ units will flow through resistor R1 and ½ unit will pass through the diode or crystal D2 to the circuit connected to point Y. It may therefore be arranged that no current passes from the point X′ to point Y unless rule 1, and only rule 1, of Table I applies.

Similarly, rule 8 can be distinguished from amongst the 27 possible rules by the circuit shown in Fig. 4, which is an inversion of the circuit of Fig. 3. The common point X′ of the matrix is connected to the anode of a diode D3, the cathode of which is connected to a source of constant voltage *d*2, and is also connected to a positive current source through the resistor R′1. Only when rule 8 applies will the current at point X′ be minus 3 units so that current will be drawn via the diode D4 from the point Y′.

In order to deal with rules 2 to 7, further pairs of circuits identical with those of Figs. 3 and 4 are used. The inputs corresponding to "A," "B" and "C1" of Figs. 3 and 4 are "C0–A," "B" and "C" for rules 2 and 7, "A," "C0–B" and "C" for rules 3 and 6, and "A," "B" and "C0–C" for rules 4 and 5. ("C0–A," "C0–B" and "C0–C" voltages are exact paraphase or polarity reversed versions of "A," "B" and "C" voltages.)

The application of the appropriate signals "A," "B," "C1," "C0–A," "C0–B" and "C0–C1" in the various combinations shown to the various matrix inputs is effected by appropriate connections from the signal sources feeding into the adder the digits "A" and "B" to be added, from phase inverter circuits (not shown) fed with signals A and B (and thus delivering "C0–A" and "C0–B"), from delay circuit 14 supplying "carry" output "C1" from delay circuit 15 supplying the "C0–carry" output ("C0–C1"). These are all permanent connections and all these signals appear at the respective matrix inputs at the same time by virtue of the inherent time schedule of the machine and the one-digit delay imposed by circuits 14 and 15, as explained hereinafter.

All the additions set up by rules 9 to 27 will fail to pass any current through any of the diodes or crystals D2 and D4 and will therefore not cause any output to be provided by a circuit connected to points Y or Y′.

The conditions giving rise to rules 1 to 8 must occur in such a manner that only one rule is obeyed at any given instant. It is therefore possible to arrange that a common circuit is connected to points Y and Y′ of the 8 distinguishing matrix elements.

Fig. 5 shows in principle the complete circuit of an adder constructed according to the present invention. Eight matrix elements 1–8 are provided, one for each of the rules 1–8 of Table I, and the output points Y, Y′ are connected in parallel to the input of an amplifier 11. Only elements 1 and 2 are shown in detail and they are identical with the circuits of Figs. 4 and 3 respectively, being arranged to distinguish −3 and +3 units of current. Elements 3, 5 and 7 are identical with element 1 and elements 4, 6 and 8 are identical with element 2. The amplifier 11 is a device which produces a stable equilibrium output level in the absence of any input signal and which produces an output signal of amplitude largely independent of input signal amplitude when an input signal is applied. The diodes D2 and D4 and the corresponding diodes of elements 3–8 are arranged to be biassed off when no input signals are applied to the matrix elements. The output signals derived from the amplifier 11 are used as the "carry" output "C2" so that to accommodate the polarity reversal occurring in the amplifier, the digit combinations applied to the various matrix elements are the inverse of those previously described and are as indicated on Fig. 5. Thus element 1 is fed with "C0–A," "C0–B" and "C0–C1" signals and the occurrence of rule 1 will be detected by the production of −3 units of current in that element with the production of a resultant positive output pulse from the amplifier 11. It will be seen that the other combinations of input digits indicated in Fig. 5 give rise to the appropriate positive or negative output pulses from amplifier 11 to give the correct "carry" digit "C2" as required by Table I.

A suitable form of circuit for the amplifier 11 is indicated in Fig. 6. A high-gain amplifier V1 is directly coupled to a cathode-follower output stage V2, negative feedback being applied via $R_B$. When all the diodes D2 and D4 of Fig. 5 are non-conducting the control grid of V1 can take no current and no current can be passed through the feed-back resistor $R_B$, so that the output point, the cathode of V2, and the control grid of V1, are both at the same potential, i. e., approximately at earth. By suitable arrangement of the values of the resistors connecting the positive supply to the anode of V1, the anode of V1 to the grid of V2 and from the grid of V2 to the negative supply, the two valves are made to operate at appropriate values of current. The control grid of V1 will then be resting at a voltage of $V_g$, say. The voltages $d2$ and $d1$ supplied to the diodes D1 and D3 in the matrix elements 1–8 are arranged so that $$\frac{d1+d2}{2}$$

is approximately equal to $V_g$ and the difference between $d1$ and $d2$ is approximately equal to 2 volts. This arrangement ensures that the diodes D2 and D4 and the corresponding diodes associated with the other matrix elements, are normally biassed off. When therefore the signals applied to the input connections of the matrix elements cause current to flow through one of diodes D2 or D4 (this will occur whenever a "failure" does not exist in one or more of the input digits) this current will be drawn partly through the resistor $R_B$ of the amplifier of Fig. 6 to cause an appropriate potential change at the output point. The voltage excursion of the output point will be limited, in the positive direction by conduction of diode D6, and in the negative direction by conduction of diode D5. Conduction of either diode D5 or D6 at output voltage levels determined by the potential dividers to which their cathode and anode, respectively, are returned, applies heavy negative feedback which limits the gain of the amplifier and ensures that the output "carry" digit signal amplitude is independent of the magnitude of the amplifier input current from the matrix, so long as that current exceeds a given threshold value.

It is now necessary to consider the generation of the "sum" output digits. Examination of the rules of Table I indicates that the "sum" and "carry" digits are always complementary, i. e. the "S" and "C2" digit pulses are always of opposite sign, except when rules 1 and 8 hold, in which case the "S" digit is the same as the "C2" digit. A second amplifier 12, Fig. 5, is therefore provided to reverse the polarity of the output from amplifier 11 and produce a "C0–carry" output. The precise nature of amplifier 12 is unimportant so long as it produces a polarity-reversed copy of the output from amplifier 11.

The "carry" output "C2," is fed out (via a suitable one-digit delay device 14 if serial representation of numbers is employed) to provide the input carry digit "C1" for the next step of addition. In order to obtain the "S" output for rules 2–7 inclusive the "carry" output "C2" is also fed via a diode gate circuit to an amplifier 13 which is similar to the amplifier 11 and produces the required (polarity-reversed) "S" output pulse of determined amplitude. The diode gate circuit comprises the diodes associated with two matrix elements 9 and 10 which are identical with the elements 1 and 2 and are fed with the same digit combination, "C0–A," "C0–B" and "C0–C1." The elements 9 and 10 are set up in the same way as the other matrix elements, each digit signal contributing one unit of current to the common point X or $X^1$, while the resistors R1 and $R1^1$ each carry 2½ units of current. The "carry" and "C0–carry" pulses from amplifiers 11 and 12 are fed via diodes D7, D8, poled so that only negative ("0") pulses are passed, to the point $X^1$, of element 9, the resistors R2, R3 being so selected that 2 units of current are contributed to $X^1$, two units always being contributed either by the "carry" or "C0–carry" pulse. Two units of current corresponding to each "carry" pulse, and of polarity dependent upon the value of the "carry" pulse, i. e. positive or negative, are also contributed to point $X^1$ via resistor R6. Matrix element 10, which is arranged to operate for plus three units of current, is similarly fed with "carry" and "C0–carry" signals via diodes D9, D10 and resistors R4, R5 and R7, but the diodes D9, D10 are so connected that they pass only positive ("1") pulses. It will thus be seen that unless rule 1 or rule 8 holds the currents fed to the points X or $X^1$ of the matrix elements 9 or 10 from the "carry" or "C0–carry" outputs over-rule the currents provided by the digits applied to the ordinary matrix input connections, and a sum output is obtained from the amplifier 13 which is of the opposite polarity to the "carry" output. However, when rule 1 or rule 8 holds, the currents from the matrix inputs will over-rule the currents from the "carry" or "C0–carry" inputs and an output from amplifier 13 will be obtained which is of the same polarity as the "carry" output pulse.

The working of this circuit may become clearer if its operation for all rules 1 to 8 is considered in detail. With this end in view we will first determine the units of current fed to the matrices 9 and 10 from 11 and 12 when the output from 11 is (1) positive and (2) negative:

*Case (1)*.—Output from 11 is positive hence from 12 is negative and the units of current through the resistors R2 to R7 are as follows:

| | |
|---|---|
| R2 ........ −2 | R4 ........ 0 |
| R3 ........ 0 | R5 ........ +2 |
| R6 ........ +2 | R7 ........ +2 |
| Total to 9=0 | Total to 10=+4 |

*Case (2)*.—Output from 11 is negative hence from 12 is positive and the units of current through the resistors R2 to R7 are as follows:

| | |
|---|---|
| R2 ........ 0 | R4 ........ +2 |
| R3 ........ −2 | R5 ........ 0 |
| R6 ........ −2 | R7 ........ −2 |
| Total to 9=−4 | Total to 10=0 |

Consider now the total units of current fed to the matrices 9 and 10 both from the digit inputs and from the amplifiers 11 and 12. These are set out in the following table.

| Rule | C2 | Output from 11 | Units fed to 9 | Units fed to 10 | Input to 13 | Output from 13 | S |
|---|---|---|---|---|---|---|---|
| 1 | 1 | Pos. | 0−1−1−1=−3 | +4−1−1−1=+1 | Neg. | Pos. | 1 |
| 2 | 1 | Pos. | 0+1−1−1=−1 | +4+1−1−1=+3 | Pos. | Neg. | 0 |
| 3 | 1 | Pos. | 0−1+1−1=−1 | +4−1+1−1=+3 | Pos. | Neg. | 0 |
| 4 | 0 | Neg. | −4+1+1−1=−3 | 0+1+1−1=+1 | Neg. | Pos. | 1 |
| 5 | 1 | Pos. | 0−1−1+1=−1 | +4−1−1+1=+3 | Pos. | Neg. | 0 |
| 6 | 0 | Neg. | −4+1−1+1=−3 | 0+1−1+1=+1 | Neg. | Pos. | 1 |
| 7 | 0 | Neg. | −4−1+1+1=−3 | 0−1+1+1=+1 | Neg. | Pos. | 1 |
| 8 | 0 | Neg. | −4+1+1+1=−1 | 0+1+1+1=+3 | Pos. | Neg. | 0 |

Notice that the matrix 9 is operated to give a negative output only when −3 units are fed to it and that the matrix 10 is operated to give a positive output only when +3 units are applied to it. Notice also that in each case the required sum digit S is obtained.

A one-digit period delay device 15 is provided to produce the "C0–carry" "C1" pulse if serial representation of numbers is employed.

It will be appreciated that should some error cause the "carry" output to fail a false answer will be provided by the "sum" output, but the fact that no "carry" signal exists is sufficient to enable the failure to be detected. Similarly if one of the diodes in the input to the amplifier 13 fails, no "sum" output signal will be generated and the absence of a "sum" signal may also be employed to operate checking or error detecting circuits.

The detection of a failure thus resolves itself into the detection of a failure in either of the "sum" and "carry" outputs. Many ways of detecting the absence of a pulse signal in a particular time location will be obvious to those skilled in the art, and an example of such a circuit is given in Fig. 7. In this circuit arrangement a trigger circuit 20 in its normal quiescent state is arranged to energise a relay 21. A valve V3 is fed with a "clock" waveform, which comprises essentially a continuous train of "1" signals, on its suppressor grid. The digit pulse train to be examined, say the "sum" signal, is fed via diode D11, and also via diode D12 and the polarity reversing amplifier V4, to the control grid of V3. Thus, so long as a "sum" digit exists irrespective of its polarity, the valve V3 will be cut off on its control grid during the "clock" pulse period. If a "sum" digit fails to arrive the "clock" pulse will be enabled to turn V3 on at its suppressor grid and the resultant output pulse will set the trigger circuit 20 into the condition in which relay 21 is released. Release of relay 21 may be caused to operate an alarm or stop the operation of the computer.

A simplification of the connections to the diodes D1—D4 associated with each matrix element is illustrated in Fig. 8. In the arrangements illustrated in Figs. 3 and 4 the cathode of D3 and the anode of D1 are returned to different bias sources *d*2 and *d*1, to ensure that when the common point formed by the anode of D4 and the cathode of D2 is at the quiescent level represented by the grid voltage $V_g$ of the following amplifier, the diodes D2 and D4 are definitely cut-off. This merely implies that the cathode of D4 must be somewhat positive, while the anode of D2 must be somewhat negative with respect to $V_g$. If therefore the cathode of D3 and the anode of D1 are together connected to a single bias source which may conveniently provide a bias equal to $V_g$, say —2 volts, then intermediate points can be found on the resistors R1 and R1[1] which will provide the requisite biasses for diodes D2 and D4 without appreciably affecting the output signal amplitudes derived. The anode of D2 may thus be connected to the junction of resistors R1*a*, R1*b*, and the cathode of diode D4 to the junction of resistors R1'*a* and R1'*b* as indicated in Fig. 8.

We claim:

1. Circuit for performing a computation process in electronic computing apparatus employing digit signals of opposite polarity to represent the "0" and "1" digits of a number on a binary scale, comprising a plurality of matrix circuits each having a plurality of input elements, each matrix being conditioned to pass a respective output signal only in response to a combination of digit signals in each matrix the algebraic sum of which exceeds a given threshold level and each related to a given possible combination of digit signals, means for applying to the input elements of each of certain of the matrix circuits a respective combination of digit signals, means for applying to the input elements of each of certain other matrix circuits polarity-reversed signals corresponding to a respective combination of digit signals, whereby the algebraic sum of said signal elements will attain said threshold level in response to a given combination of digit signals only in the related matrix circuit and only in the presence of the full component number of said digit signals, and means for delivering the appropriate digit signals representing the result of the computation in response to an output signal from any of said matrix circuits.

2. Circuit for performing the process of addition in electronic computing apparatus employing digit signals of opposite polarity to represent the "0" and "1" digits of a number on a binary scale, comprising a plurality of matrix circuits each conditioned to pass an output signal only in response to a combination of signal elements the algebraic sum of which exceeds a given threshold level and each related to a given possible combination of digit signals, means for applying to each matrix circuit signals representing an appropriate translation of the related combination of digit signals into polarity-retained and polarity-reversed form, whereby the algebraic sum of said signal elements will attain said threshold level in response to a given combination of digit signals only in the related matrix circuit and only in the presence of the full component number of said digit signals, and means for delivering the appropriate "sum" and "carry" digit signals representing the result of the addition in response to an output from any of said matrix circuits.

3. Circuit for performing the process of addition in electronic computing apparatus employing digit signals of opposite polarity to represent the "0" and "1" digits of a number on a binary scale, comprising a plurality of matrix circuits some of which are conditioned to pass an output signal of positive polarity in response to respective combinations of signal elements the algebraic sum of which exceeds a first threshold level and the others of which are conditioned to pass an output signal of negative polarity in response to respective combinations of signal elements the algebraic sum of which exceeds a second threshold level, means for applying to each matrix circuit a combination of signal elements representing in each case an appropriate translation of a given possible combination of digit signals to be added, into polarity-retained and polarity-reversed form whereby the algebraic sum of said signal elements will attain either said first or said second threshold level only in the matrix circuit allotted to said given possible combination of digit signals to be added and only in the presence of a full complement of digit signals, and means for delivering the appropriate "sum" and "carry" digit signals representing the result of the addition, in response to an output from any of said matrix circuits.

4. Circuit for performing the process of addition in electronic computing apparatus employing digit signals of opposite polarity with respect to a datum signal level to represent the "0" and "1" digits of a number on a binary scale, comprising a plurality of matrix circuits each having an input for the signal elements of each of the numbers to be added and an input for signal elements denoting "carry" digits, means for applying to the input of each matrix circuit a combination of signal elements representing in each case an appropriate translation of a given possible combination of digit signals to be added into polarity-retained and polarity-reversed form whereby the algebraic sum of said signal elements will attain either said first or said second threshold level only in the matrix circuit allotted to said given possible combination of digit signals, bias means for said matrix circuits connected to inhibit operation of some of said circuits except in response to certain combinations of input signal elements the algebraic sum of which exceeds a first threshold level determined by said bias means, further bias means connected to others of said matrix circuits to inhibit operation thereof except in response to certain other combinations of input signal elements the algebraic sum of which exceeds a second threshold level determined by said further bias means, a "sum" channel output amplifier, a "carry" channel output amplifier and means for routing output signals in the appropriate senses through said output channel amplifiers in response to an output from any one of said matrix circuits.

5. Circuit for performing the process of addition in electronic computing apparatus employing digit signals of opposite polarity to represent the "0" and "1" digits of a number on a binary scale, comprising a plurality of matrix circuits some of which are conditioned to pass an output signal of positive polarity in response to respective combinations of signal elements the algebraic sum of which exceeds a first threshold level and the others of which are conditioned to pass an output signal of negative polarity in response to respective combinations of signal elements the algebraic sum of which exceeds a second threshold level, means for applying to each matrix circuit a combination of signal elements representing in each case an appropriate translation of a given possible combination of digit signals to be added, into polarity-retained and polarity-reversed form whereby the algebraic sum of said signal elements will attain either said first or said second threshold level only in the matrix circuit allotted to said given possible combination of digit signals to be added and only in the presence of a full complement of digit signals, means for delivering the appropriate "carry" digit for the result of the addition to a "carry" output channel, means for delivering a "sum" digit in the form of a polarity-reversed "carry" digit to a "sum" output channel, and means including a further pair of matrix circuits for delivering a "sum" digit in the same polarity as said "carry" digit to said "sum" output channel in response to the given combinations of digit signals to which said further pair of matrix circuits respond.

6. Circuit for performing the process of addition in electronic computing apparatus employing digit signals of opposite polarity to represent the "0" and "1" digits of a number on a binary scale, comprising a plurality of matrix circuits some of which are conditioned to pass an output signal of positive polarity in response to respective combinations of signal elements the algebraic sum of which exceeds a first threshold level and the others of which are conditioned to pass an output signal of negative polarity in response to respective combinations of signal elements the algebraic sum of which exceeds a second threshold level, means for applying to each matrix circuit a combination of signal elements representing in each case an appropriate translation of a given possible combination of digit signals to be added into polarity-retained and polarity-reversed form whereby the algebraic sum of signal elements will attain either said first or said second threshold level only in the matrix circuit allotted to said given possible combination of digit signals to be added and only in the presence of a full complement of digit signals, means for delivering a "carry" output digit signal of appropriate polarity to a "carry" output signal channel in response to an output from any one of said matrix circuits, a further matrix circuit allotted to, and conditioned to pass an output signal in response to, the incidence of a positive signal element in all of its signal element inputs, a second further matrix circuit allotted to and conditioned to pass an output signal in response to, the incidence of a negative signal element in all of its signal element inputs and means for applying signals from said "carry" output circuits to override the signals applied thereto through their signal element inputs except in the two eventualities when these last named signals are originally all positive or all negative, said further matrix circuits being connected to a "sum" output channel whereby a polarity-reversed version of said "carry" output digit signal will be delivered to said "sum" output channel except when said two eventualities occur.

7. Circuit as claimed in claim 6 including phase reversing means connected in said "carry" output channel, polarity-discriminating signal channels for conveying polarity-retained signals from said "carry" output channel to both said further matrix circuits without polarity discrimination whereby the signals so conveyed will combine to provide an output signal from one of said further matrix circuits to feed said "sum" output channel with a signal polarity-reversed with respect to the corresponding signal in the "carry" output channel, except when such signals are overridden by signals applied to the signal element inputs of said further matrix circuits.

8. Circuit for performing the process of addition in electronic computing apparatus employing digit signals of opposite polarity to represent the "0" and "1" digits of a number on a binary scale, comprising a plurality of positive output matrix circuits each having a first number signal element input, a second number signal element input, a "carry" signal element input, an output and bias means for inhibiting output signals from said matrix circuits except in response to positive signal elements in all three inputs of one of said positive output matrix circuits, a plurality of negative output matrix circuits each having a first number signal element input, a second number signal element input, a "carry" signal element input, an output and bias means for inhibiting output signals from said matrix circuits except in response to negative signal elements in all three inputs of one of said negative output matrix circuits, means for applying to the inputs of each matrix circuit a combination of signal elements representing in each case an appropriate translation into polarity-retained and polarity-reversed forms of the digit signals to be added whereby, for any given possible combination of digit signals to be added, three like signals will be applied to the inputs of only one of said matrix circuits to provide a positive or negative output signal, means for delivering said output signal to a "carry" signal channel, means for delivering a polarity-reversed version of said output signal to a "sum" channel and means in said "sum" channel for overriding said polarity-reversed output signal to provide an output signal equivalent to the signal in said "carry" channel in response to a combination of three like digit signals to be added.

9. A circuit for performing a computation process in electronic computing apparatus employing digit signals of opposite polarity to represent the "0" and the "1" digits of a number on a binary scale that comprises a plurality of matrix circuits, means to apply said digit signals to said matrix circuits, means to reverse the polarity of one of said digit signals to each matrix except one, means to bias said matrix circuits so that an output is obtained therefrom only when the algebraic sum of said input signals after said polarity reversal is the full component number of said input signals, and means for delivering the appropriate digit signals representing the result of the computation in response to an output signal from any of said matrix circuits.

10. A circuit for performing an addition in electronic computing apparatus employing digit signals of opposite polarity to represent the "0" and "1" digits of a number on a binary scale, comprising a plurality of matrix circuits each having a respective input resistor for each of the augend, addend and carry signals, the said resistors being connected to a common point, a unidirectional conductive device and a further resistor connected to the common point, there being a bias potential across the conductive device and the further resistor to maintain a current through them of less value than the total current through the three input resistors when input signals of like polarity are applied to the three simultaneously; a second unidirectional conductive device connected to the common point in each matrix and conditioned to respond only to the effect of the excess of current through the three input resistors over the current maintained through the first conductive device, the second conductive device in certain of the matrices being conditioned to respond and pass an output signal only when all the signals applied to the three input resistors are positive and the second conductive device in others of the matrices being conditioned to respond and pass an output signal only when all three applied input signals are negative, and means for delivering the appropriate digit signals representing the result of the computation in response to an output signal from any of said matrix circuits.

11. A circuit as defined in claim 10, wherein the means for delivering digit signals in response to the output of any matrix delivers "sum" and "carry" digit signals correctly representing the results of the addition operation.

12. In an electronic digital computer, a matrix that includes a plurality of resistors of equal value connected to a common point, a first unidirectional conductive device having at least an input and an output element whereof the one element is connected to the said common point, a further resistor connected to the common point, a biasing potential being applied across the further resistor and the device to maintain through the further resistor and the device a current of predetermined value; a second unidirectional conductive device having at least an input and an output element, and a signal responsive circuit, one element of the second device being connected to said common point and another element to the signal responsive circuit, said second device connected to take off any current which reaches said common point from said equal resistors and being biased to pass current and so give an output signal when the algebraic sum of the currents through the equal resistors exceeds a predetermined threshold value of predetermined polarity.

13. In an electronic digital computer, a matrix as defined in claim 12, wherein the output element of the first device is connected to the common point, the input element of the second device is connected to said point, that terminal of the further resistor distal from the common point is negative, and the second device is biased to pass current when the sum of the currents through the equal resistors is positive and exceeds a predetermined threshold value.

14. In an electronic digital computer, a matrix as defined in claim 12, wherein the input element of the first device is connected to the common point, the output element of the second device is connected to said common point, that terminal of the further resistor distal from the common point is positive, and the second device is biased to pass current when the sum of the currents through the equal resistors is negative and exceeds a predetermined threshold value.

15. In an electronic digital computer, a pair of matrices comprising: a first matrix having three input resistors of equal value connected to a common point, a first diode having its anode connected to the common point, further resistor connected to the common point, there being a biasing potential applied across the further resistor and the diode to maintain through the further resistor and the diode a current of predetermined value, a second diode having its cathode connected to the common point, the second diode being biased to pass current only when the sum of the currents through the input resistors exceeds the current through the first diode; a second matrix having three input resistors of equal value connected to another common point, a third diode having its cathode connected to the other common point, a further resistor also connected to the other common point, there being a biasing potential applied across the third diode and the associated further resistor to maintain through the third diode and the said associated further resistor a current of predetermined value and of a polarity opposite to the polarity of the current through the first diode, a fourth diode having its anode connected to the other common point, the fourth diode being biased to pass current only when the sum of the currents through the three input resistors of the second matrix exceeds the current through the third diode; and a signal responsive circuit connected to the anode of the second diode and to the cathode of the fourth diode.

16. In an electronic digital computer, a first pair of matrices as defined in claim 15 whereof the first matrix is conditioned to respond to a prescribed combination of digit signals applied to the three input resistors thereof and the second matrix is conditioned to respond to a polarity-reversed copy of the said combination of digit signals; a plurality of other similar matrices each conditioned to respond to a respective unique combination of input digit signals; another pair of matrices identical with the first pair, the first matrix and the second matrix of the second pair being conditioned to respond respectively to the same combination of input digit signals as are the corresponding members of the first pair; a first amplifier connected to receive signals from all matrices except those of the second pair, a polarity-reversing amplifier and a "carry" output connected to the output of the first amplifier; a fifth diode and a sixth diode, means including a suitable respective resistor connecting the cathode of the fifth diode to the output of the reversing amplifier and the cathode of the sixth diode to the output of the first amplifier; a seventh and an eighth diode, means including a respective suitable resistor connecting the anode of the seventh diode to the output of the reversing amplifier and the anode of the eighth diode to the output of the first amplifier; means including a suitable resistor connecting the output of the first amplifier to the common point of the first matrix of said other pair and like means connecting the output of the first amplifier to the common point of the second matrix of said other pair, the anodes of the fifth and sixth diodes being connected to the common point of the first matrix of said other pair and the cathodes of the seventh and eighth diodes being connected to the common point of the second matrix of the said other pair, and a "sum" output amplifier connected to the anode of the sixth diode and to the cathode of the eighth diode.

References Cited in the file of this patent

UNITED STATES PATENTS

| | | |
|---|---|---|
| 2,425,131 | Snyder | Aug. 5, 1947 |
| 2,429,227 | Herbst | Oct. 21, 1947 |
| 2,557,729 | Eckert | June 19, 1951 |
| 2,588,209 | Crapuchettes | Mar. 4, 1952 |
| 2,609,143 | Stibitz | Sept. 2, 1952 |

OTHER REFERENCES

"Progress Report (2) on the Edvac," Univ. of Pennsylvania, June 30, 1946 (declassified February 13, 1947), pages 1-1-24, 1-1-24A, 1-1-25, 1-1-25A, 1-1-25B.